March 26, 1935. G. E. SEIL 1,995,947

MEANS FOR MOLDING ARTICLES

Filed Oct. 28, 1932 3 Sheets-Sheet 1

Inventor:
Gilbert E. Seil
by his Attorneys
Howson & Howson

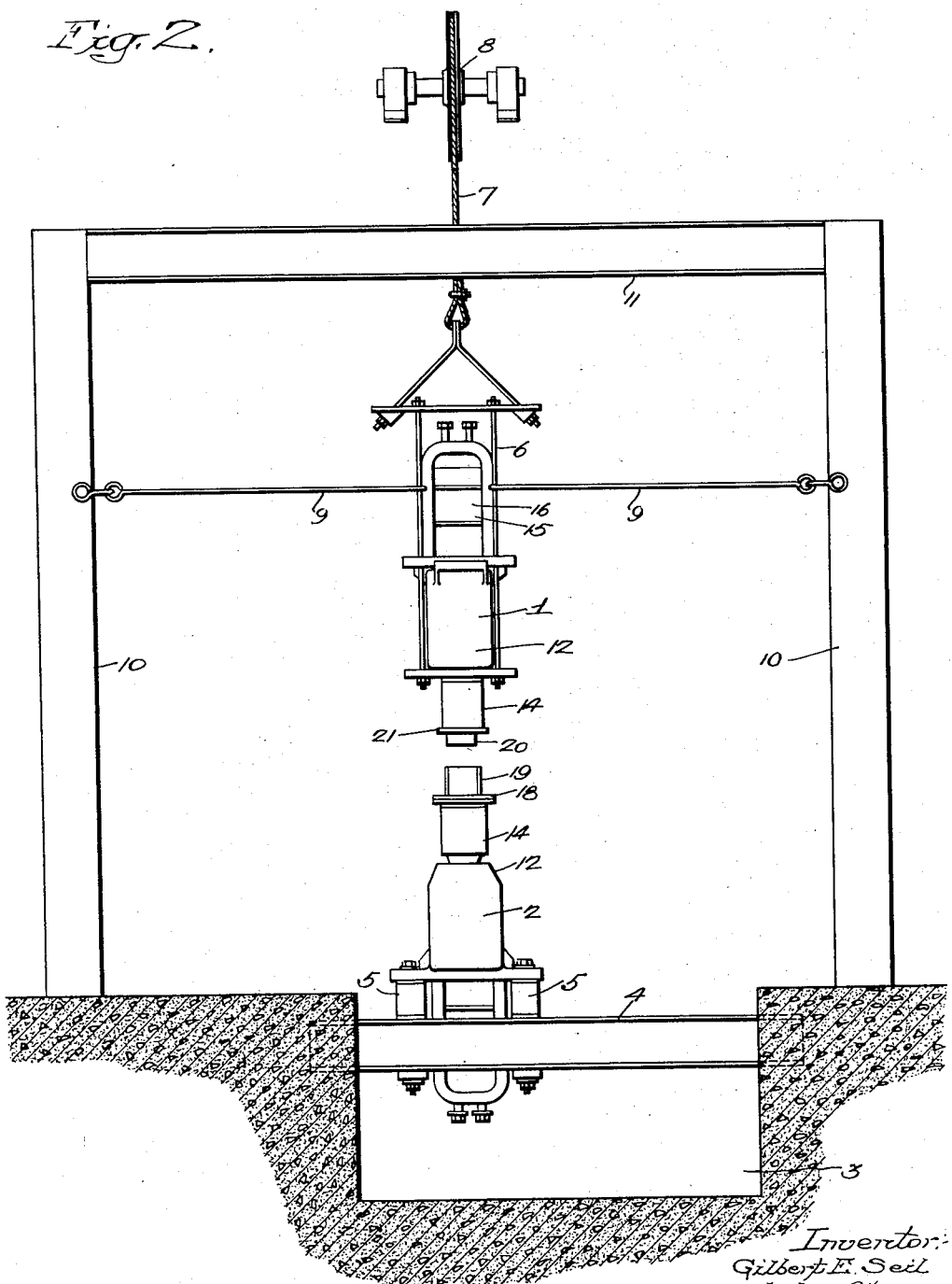

March 26, 1935.    G. E. SEIL    1,995,947
MEANS FOR MOLDING ARTICLES
Filed Oct. 28, 1932    3 Sheets-Sheet 3
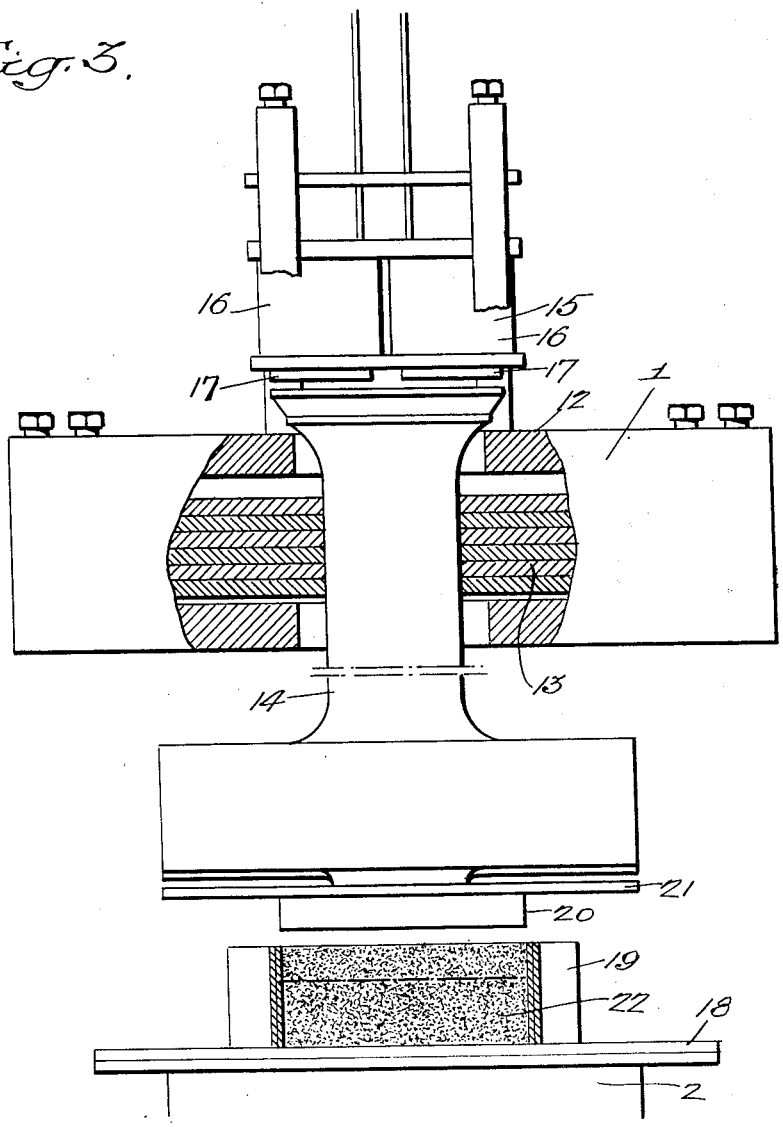
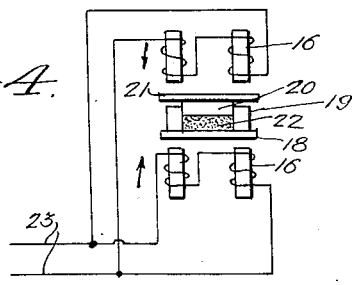

Patented Mar. 26, 1935

1,995,947

UNITED STATES PATENT OFFICE 1,995,947

MEANS FOR MOLDING ARTICLES

Gilbert E. Seil, Conshohocken, Pa., assignor to E. J. Lavins and Company, Philadelphia, Pa., a corporation of Delaware Application October 28, 1932, Serial No. 640,100

5 Claims. (Cl. 25—41)

This invention relates to methods and means for forming articles of manufacture especially those made from granular, pulverulent, or powdered material. More particularly, the invention is directed to the shaping of articles, such as bricks, cement blocks, etc., from their usual constituent material.

An object of the invention is to provide a novel method of shaping articles by subjecting a mass of the material to vibrational energy and regulable pressure.

Another object of the invention is to provide novel apparatus for practicing the method disclosed herein. In the manufacture of the shaped articles according to the present invention, two vibrator units are employed, one above the other. They are operated in opposed relation or out of synchronism or unison with each other. The granular, pulverulent, or powdered material containing the necessary amount of water or other plasticizing agent is placed in weighed quantities in an open mold carried by the lower vibrating unit, which mold has sides that are higher than the finished article. The upper vibrator has a plate which fits into the mold and the movement of this vibrator is limited by engagement of the armature thereof with the upper edge of the mold so that an article of predetermined thickness from the weighed quantity is obtained. The depth of the plate entering the mold determines the thickness as well as the porosity and density of the material. The upper vibrator is movable as a unit and the pressure applied to the mass may be adjusted or regulated at will.

The invention is particularly applicable in the making of refractories, or other bodies of odd shapes from moldable material, for example, from subdivided plastic material, which cannot be made economically in the standard brick presses, due to the cost of making and operating molds of irregular shapes and sizes. While it is particularly applicable to the manufacture of refractory materials, such as silica, chromite, magnesite and fire clay refractories, it may be used to advantage also in the manufacture of shaped or molded products made up from any plastic granular, pulverulent or powdered materials, for example, cement or cinder blocks and the like. In all cases the material after mixing as it is prepared prior to the pressing or molding operation may be used. In the case where refractory materials are employed, the same material is employed in the method of the present invention as is utilized in the standard refractory presses, for example, the material is taken directly from the tempering pan after it has been tempered in the presence of water and a suitable binder such as boiled starch, goulac and or oil. After the molding or pressing process of the present invention has been carried out as hereinafter described, the shaped mass may be subjected to further treatment such as is usually employed in the manufacture of products from the particular material used, for example, in the case of refractories the shaped mass may be subjected to burning in a kiln.

Other objects and features of the invention will be more clearly apparent hereinafter. A clear understanding of the invention may be had from the following detailed description and the accompanying drawings, in which Fig. 1 is a side elevational view of the novel apparatus of the invention;

Fig. 2 is an end elevational view of the apparatus;

Fig. 3 is an enlarged detail view showing clearly one of the vibrator units; and Fig. 4 is a schematic diagram illustrating the circuit connections.

Figure 1:
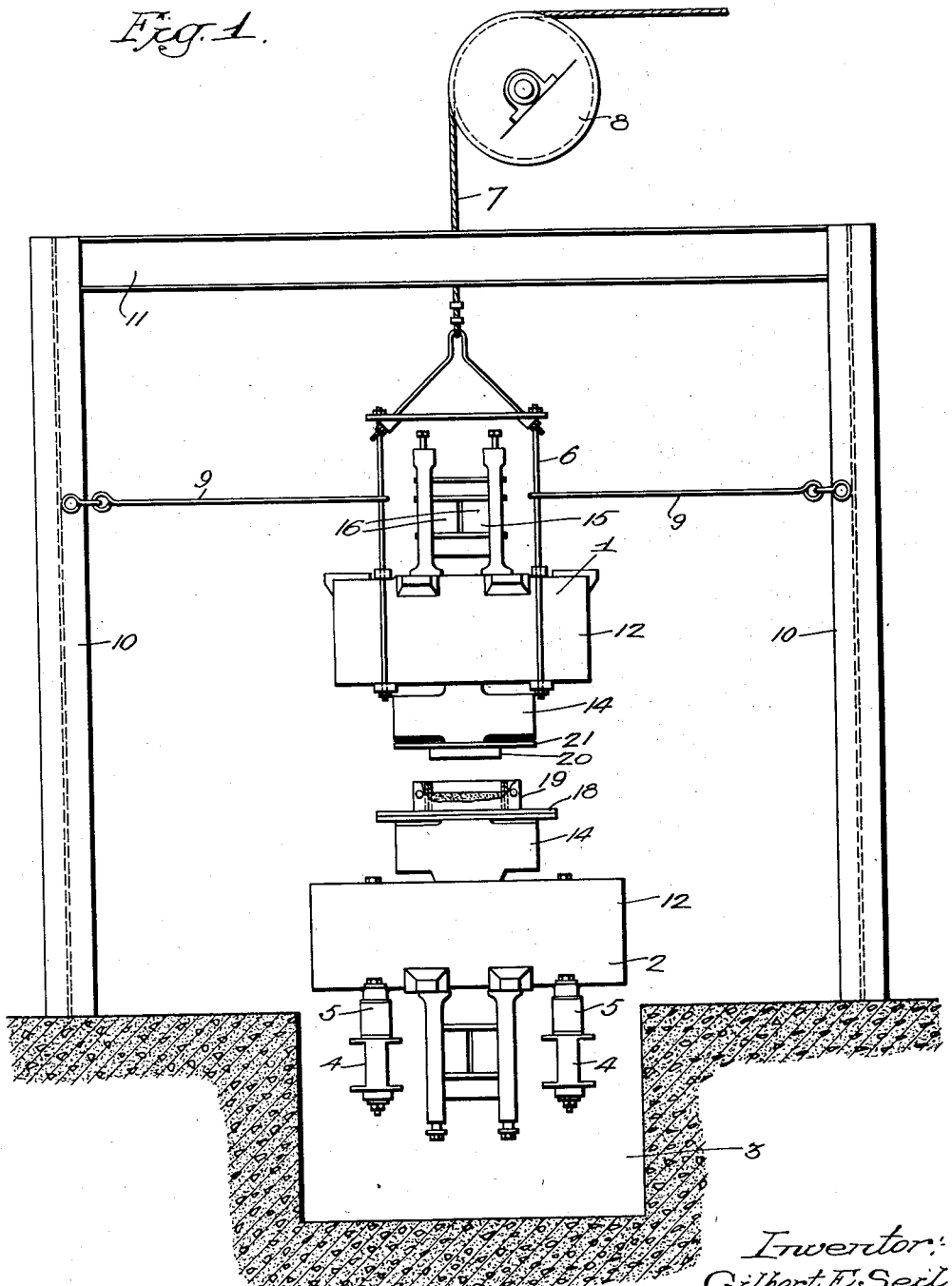

Referring particularly to Figs. 1 and 2 of the drawings, the apparatus comprises an upper vibrator unit 1 and a lower vibrator unit 2. The lower vibrator unit is stationary and may be mounted over a pit 3 upon cross-beams 4. In the specific illustration, the unit is mounted upon supporting blocks 4 carried by the cross-beams.

The upper vibrator unit 1 is movably supported, being carried by supporting frame 6 suspended from a cable 7 passing over pulley 8 and leading to any suitable counter-balancing or hoisting mechanism. The vibrator may thus be moved vertically for reasons which will appear more clearly hereinafter. In order to centralize properly the movable vibrator unit, guy rods 9 are connected between the framework 6 and standards 10 of the framework 11. The guy rods are arranged so as not to interfere with the vertical movement of the vibrator unit, while maintaining the unit in centralized positon.

While the vibrator units may take any form which is suitable for the purpose contemplated herein, they preferably take the form illustrated more clearly in Fig. 3. Referring to that figure, each unit comprises a heavy frame casting 12 carrying transversely extending bars 13 through which an armature 14 extends, the armature being rigidly connected to the bars in any suitable fashion, such for example, as by belting the armature to the bars. The bars are flat, are preferably formed of steel, and are rigidly fastened at their ends to the heavy frame casting. Under the influence of the movable armature, they may be set into vibration. The vibrator also comprises the electromagnet device 15, which, in turn, comprises energizing coils 16 wound upon laminated cores or poles 17. The electromagnet device is also carried by the heavy frame casting.

When the coils 16 are energized, the electromagnet attracts armature 14, as will be apparent. The electromagnet structure is designed for use with alternating current or current having an alternating or fluctuating component, so that the current flow through the coils varies successively between zero or a minimum value and maximum value. The magnetic pull on the armature is thus varied cyclically and the armature is subjected to successive attractive forces acting against the springs 13. The springs tend to oppose any change in the position of the armature and energy is stored in the springs by movement of the armature which tends to sustain the armature in a condition of oscillation. The vibrating structure, including the armature and the springs, is preferably designed so that its resonant frequency of vibration is substantially the same as the frequency of the magnetic forces acting upon the armature by virtue of the pulsating current flowing through coils 16. The frequency of the magnetic forces acting upon the armature is, of course, dependent upon the frequency of the pulsating current supplied to the device. The armature is thus sustained in a condition of oscillation at or near the critical frequency of the vibrating structure.

The armature of the lower vibrator unit 2 carries a plate 18, upon which an open mold 19 is removably carried. The armature of the upper vibrator 1 carries a removable plate 20 which is of such size and shape that it will fit snugly within mold 19. The plate has a flange or shoulder 21.

Fig. 4 illustrates diagrammatically a simple electrical circuit which may be used with the apparatus. In this figure, the vibrating plates and the mold with the material therein are shown diagrammatically as are also the electromagnetic devices. The operation described above will perhaps be clearer from a consideration of this illustration. It will be noted that the coil pairs of the vibrator units are connected in parallel relation across supply conductors 23 which may be connected to any suitable source of alternating or pulsating current having a suitable frequency and amplitude. Direct connection to a 25 cycle source giving 3,000 pulsations per minute is satisfactory. The individual coils of the coil pairs are serially connected. It is to be understood that the invention is not limited to this specific illustration but that the circuit arrangement may be varied at will. It will be noted that the respective coil pairs of the vibrator units are arranged so that for any given direction of current flow, the magnetic forces exerted upon the armatures of the units are substantially opposed. By means of the familiar right hand rule, it may be readily determined that for a given direction of current flow, the magnetic forces will be in the directions of the arrows. Thus, by suitably arranging the coils, it is possible to obtain the desired opposing action of the vibrator units. It is not essential, however, that the units operate in direct opposition to each other, but they may be merely operated out of synchronism or unison with each other. If desired, this action may be obtained by dephasing the currents through the parallel branch circuits of the coil pairs, as for example for inserting inductance in one branch circuit and capacitance in the other branch circuit so as to dephase currents a desired amount, depending upon the values of the dephasing elements. It is to be understood then that any arrangement whereby the vibrator units act in the manner above set forth is contemplated by the invention.

In practicing the proposed method, the upper vibrator unit is first positioned so that free access may be had to mold 19. A weighed quantity of material 22 is placed in the open mold and the upper vibrator unit is lowered to a suitable position immediately above the mold. The apparatus is now ready for operation and the vibrator units are set into operation. It is not necessary that the vibrator units be set into operation simultaneously. Each may be started at different times as desired. The armature of the lower vibrator unit carries the mold and the material therein up and down in vibratory fashion, while the armature of the upper vibrator unit vibrates in opposed relation or out of synchronism or unison with the armature of the lower vibrator unit. Plate 20 moves slidably in the mold and the movement of the armature carrying the plate is limited by engagement of flange 21 with the upper edge of the mold. The horizontal cross-sectional area of the mass of material is constrained to a predetermined area by the mold, while the upper and lower surfaces of the material are subjected to vibrational energy and pressure by plates 20 and 18. This operation is continued until the shaping of the material to the desired form and density is completed.

It is important to note that the pressure may be regulated by varying the position of the upper vibrator through the medium of the counterbalancing mechanism or by weighting the upper vibrator. This vibrator is sufficiently heavy to maintain its position while vibrating and its weight therefore provides considerable pressure. By weighting it additional pressure may be obtained. Also by manipulation of the counter-balancing mechanism the effect of the vibrator weight in exerting pressure on the mass may be varied even to the extent of exerting practically no pressure on the mass. Thus it is possible to predetermine the density of the finished mass by a conjoint regulation of the vibrational energies and the pressure exerted.

It will be apparent that with any given mold and quantity of material, the thickness, as well as the porosity and density of the shaped article will depend upon the depth or thickness of plate 20. By having this plate removable, the mentioned characteristics of the article may be varied at will by substituting varying sized plates.

Although a specific form of apparatus for performing the method contemplated by the invention has been illustrated and described for the purpose of disclosure, it will be apparent that changes and modifications in the apparatus may be made without departing from the spirit and scope of the invention.

I claim:

1. Apparatus for forming an article from moldable material, comprising upper and lower opposed electrically operable vibrating units, each of said units being adapted for operation by pulsating current and each having a resonant frequency of vibration substantially equal to the frequency of vibration caused by the current used, means for supporting the lower unit rigidly, a mold carried by the vibrating element of the lower unit, a plate carried by the vibrating element of the upper unit and adapted to enter the mold from the top thereof, and means for movably suspending the upper unit in proper relation to said mold, said upper unit being of sufficient weight to maintain its position while vibrating, whereby a predetermined quantity of material in said mold may be subjected directly to opposed harmonic vibrational energies and to predetermined regulable pressure.

2. Apparatus for forming an article from moldable material, comprising upper and lower opposed electrically operable vibrating units, each of said units being adapted for operation by pulsating current and each having a resonant frequency of vibration substantially equal to the frequency of vibration caused by the current used, means for supporting the lower unit rigidly, a plate carried by the vibrating element of the lower unit, an open mold carried by said plate, a second plate carried by the vibrating element of the upper unit and adapted to enter the mold from the top thereof, and means for movably suspending the upper unit in proper relation to said mold, said upper unit being of sufficient weight to maintain its position while vibrating, whereby a predetermined quantity of material in said mold may be subjected directly to opposed harmonic vibrational energies and to predetermined regulable pressure.

3. Apparatus for forming an article from moldable material, comprising upper and lower opposed electrically operable vibrating units, each of said units being adapted for operation by pulsating current and each having a resonant frequency of vibration substantially equal to the frequency of vibration caused by the current used, means for supporting the lower unit rigidly, a plate carried by the vibrating element of the lower unit, an open mold carried by said plate, a second plate carried by the vibrating element of the upper unit and adapted to enter the mold from the top thereof, said second plate having a flange which abuts against the top of the mold and limits the movement of the plate, and means for movably suspending the upper unit in proper relation to said mold, said upper unit being of sufficient weight to maintain its position while vibrating, whereby a predetermined quantity of material in said mold may be subjected directly to opposed harmonic vibrational energies and to predetermined regulable pressure.

4. Apparatus for forming an article from moldable material, comprising upper and lower opposed electrically operable vibrating units, each of said units being adapted for operation by pulsating current and comprising a transverse leaf spring structure anchored at its ends and carrying an electromagnetically operable armature at its central portion, means for supporting the lower unit rigidly, a mold carried by the vibrating element of the lower unit, a plate carried by the vibrating element of the upper unit and adapted to enter the mold from the top thereof, and means for movably suspending the upper unit in proper relation to said mold, said upper unit being of sufficient weight to maintain its position while vibrating, whereby a predetermined quantity of material in said mold may be subjected directly to opposed harmonic vibrational energies and to predetermined regulable pressure.

5. Apparatus for forming an article from moldable material, comprising upper and lower opposed electrically operable vibrating units, each of said units being adapted for operation by pulsating current and comprising a plurality of transverse superposed flat spring members anchored at their ends and carrying an electromagnetically operable armature at their central portions, the spring members and armature of each unit constituting a vibratory assembly having a certain resonant frequency of vibration substantially equal to the frequency of the electromagnetic forces acting upon the armature, means for supporting the lower unit rigidly, a mold carried by the vibrating element of the lower unit, a plate carried by the vibrating element of the upper unit and adapted to enter the mold from the top thereof, and means for movably suspending the upper unit in proper relation to said mold, said upper unit being of sufficient weight to maintain its position while vibrating, whereby a predetermined quantity of material in said mold may be subjected directly to opposed harmonic vibrational energies and to predetermined regulable pressure.

GILBERT E. SEIL.

CERTIFICATE OF CORRECTION.

Patent No. 1,995,947. March 26, 1935.

GILBERT E. SEIL.

It is hereby certified that the name of assignee in the above numbered patent was erroneously written and printed as "E. J. Lavins and Company" whereas said name should have been written and printed as E. J. Lavino and Company, as shown by the records of assignments in this office; and that the said Letters Patent should be read with this correction therein that the same may conform to the record of the case in the Patent Office.

Signed and sealed this 23rd day of April, A. D. 1935.

Leslie Frazer (Seal) Acting Commissioner of Patents.